United States Patent
Wang et al.

(10) Patent No.: US 7,071,923 B2
(45) Date of Patent: Jul. 4, 2006

(54) OPTICAL MECHANISM OF AN OPTICAL MOUSE

(75) Inventors: Ching-Pin Wang, Taipei (TW); Li-Wen Tseng, Kaohsiung (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 217 days.

(21) Appl. No.: 10/687,755

(22) Filed: Oct. 20, 2003

(65) Prior Publication Data

US 2004/0212593 A1    Oct. 28, 2004

(30) Foreign Application Priority Data

Apr. 23, 2003    (TW)   ............................... 92206443 U

(51) Int. Cl.
  *G09G 5/08*    (2006.01)
(52) U.S. Cl. ........................................ 345/166; 345/163
(58) Field of Classification Search ........ 345/156–157, 345/163–166
See application file for complete search history.

(56) References Cited

U.S. PATENT DOCUMENTS

| | | | | |
|---|---|---|---|---|
| 4,647,771 A * | 3/1987 | Kato | ...................... | 250/237 R |
| 6,256,016 B1 * | 7/2001 | Piot et al. | ................... | 345/166 |
| 6,927,758 B1 * | 8/2005 | Piot et al. | ................... | 345/166 |
| 2002/0175274 A1 * | 11/2002 | Black | ........................ | 250/216 |
| 2004/0208348 A1 * | 10/2004 | Baharav et al. | ............. | 382/124 |
| 2004/0265546 A1 * | 12/2004 | Brophy | ....................... | 428/192 |
| 2005/0094154 A1 * | 5/2005 | Baney et al. | ................ | 356/499 |
| 2005/0168445 A1 * | 8/2005 | Piot et al. | ................... | 345/163 |

FOREIGN PATENT DOCUMENTS

DE    29803448 U1 *   2/1998

* cited by examiner

*Primary Examiner*—Amare Mengistu
(74) *Attorney, Agent, or Firm*—Bacon & Thomas, PLLC

(57) ABSTRACT

An improved optical mechanism of an optical mouse is disclosed. The improved optical mechanism is implemented inside the optical mouse and applies a layer of black coating or a surface processing to surface adjacent to photosensor surroundings to thus form an absorbing layer for absorbing reflecting light not directly projected to a photosensor, thereby advantageously receiving relatively high light points by the photosensor and increasing light-and-shade contrast, i.e., stressing the corresponding light as the light is directly projected to the photosensor and otherwise, the corresponding shade is stressed. Therefore, the performance on determining the mouse image is actually increased.

6 Claims, 3 Drawing Sheets

OPTICAL MECHANISM OF AN OPTICAL MOUSE

BACKGROUND OF THE INVENTION

1. Field of the Invention

The present invention relates to an improvement of a mouse mechanism and, more particularly, to an improved optical mechanism of an optical mouse.

2. Description of Related Art

In typical optical mouse techniques, the operation principle essentially determines motions of an optical mouse by judging an uneven or micro-scraggy surface of a use plane (for example, a desk surface or a mouse pad).

With reference to FIGS. 1 and 2, a typical optical mechanism is implemented inside an optical mouse 5 in which the reflecting light is schematically shown. The typical optical mechanism includes a light device 51, a light guiding device 52 and a photosensor 53. The light guiding device 52 has a first lens 521, a second lens 522, a first prism 523, a second prism 524 and a cavity 525. The light device 51 emits an incident light $I_2$ to the first lens 521. The incident light $I_2$ is then reflected by the first prism 523 and the second prism 524 to pass through a bottom opening 50 of the optical mouse 5 and project on a reflective plane 6. Because the reflective plane 6 is uneven, a reflecting light $R_2$ formed after the incident light $I_2$ reaches the reflective plane 6 will be scattered and repeatedly reflected between the cavity 525 and the reflective plane 6. In this case, the reflecting light $R_2$ to the second lens 522 is guided to the photosensor 53 for judging the status of the plane 6 and thus determining motions of the optical mouse 5.

However, in the cited optical mechanism, because the reflecting light $R_2$ is repeatedly reflected between the cavity 525 and the reflective plane 6, the photosensor 53 receives not only the reflecting light $R_2$ firstly reflected by the reflective plane 6 but also light repeatedly reflected. Accordingly, light contrast is reduced so that the optical mouse 5 does not easily determine existence of uneven or micro-scraggy in the reflective plane 6.

Therefore, it is desirable to provide an improved optical mechanism to mitigate and/or obviate the aforementioned problems.

SUMMARY OF THE INVENTION

An object of the present invention is to provide an improved optical mechanism of an optical mouse, which significantly presents uneven or micro-scraggy features of a use plane to increase the image-determining performance of the optical mouse.

Another object of the present invention is to provide an improved optical mechanism of an optical mouse, which uses an illumination technique to produce relatively high light points to increase light-and-shade contrast.

To achieve the objects, the improved optical mechanism of an optical mouse of the present invention is implemented inside the optical mouse with a bottom opening. The improved optical mechanism includes a light device, a light guiding device, a photosensor and an absorbing layer. The light device provides an incident light. The light guiding device guides the incident light to pass through the bottom opening and thus project on a reflective plane. The photosensor implemented in the optical mouse above the bottom opening receives a reflecting light generated on the reflective plane by reflecting the incident light. The absorbing layer coated and attached on a surface around the photosensor absorbs reflecting light not directly projected to the photosensor.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
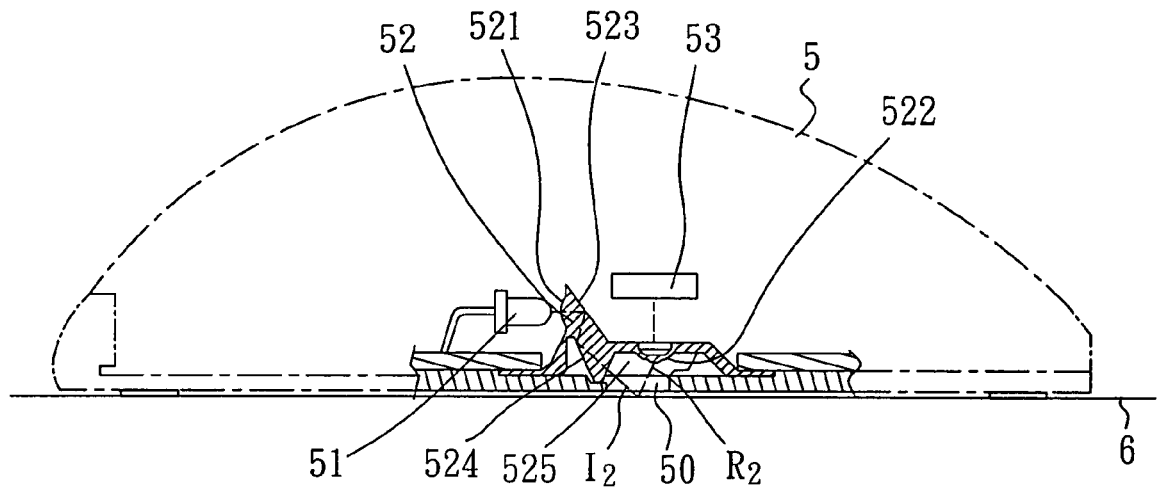
FIG. 1 is a cross-section of a typical optical mouse interior.
Figure 2:
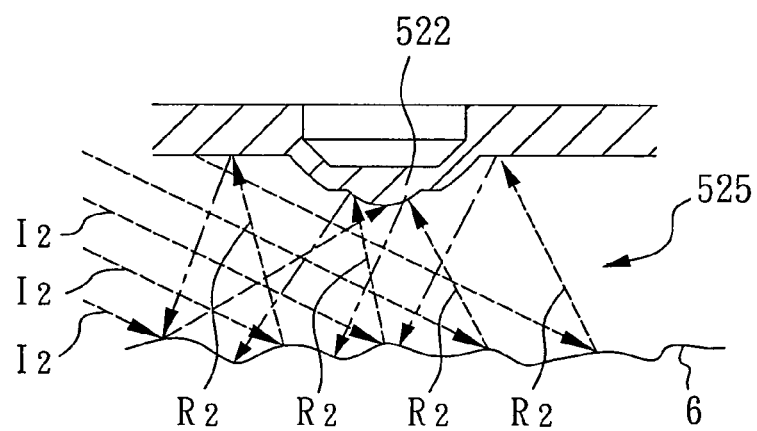
FIG. 2 is a schematic diagram of imaging formed by incident light in an optical mechanism of the typical optical mouse.
Figure 3:
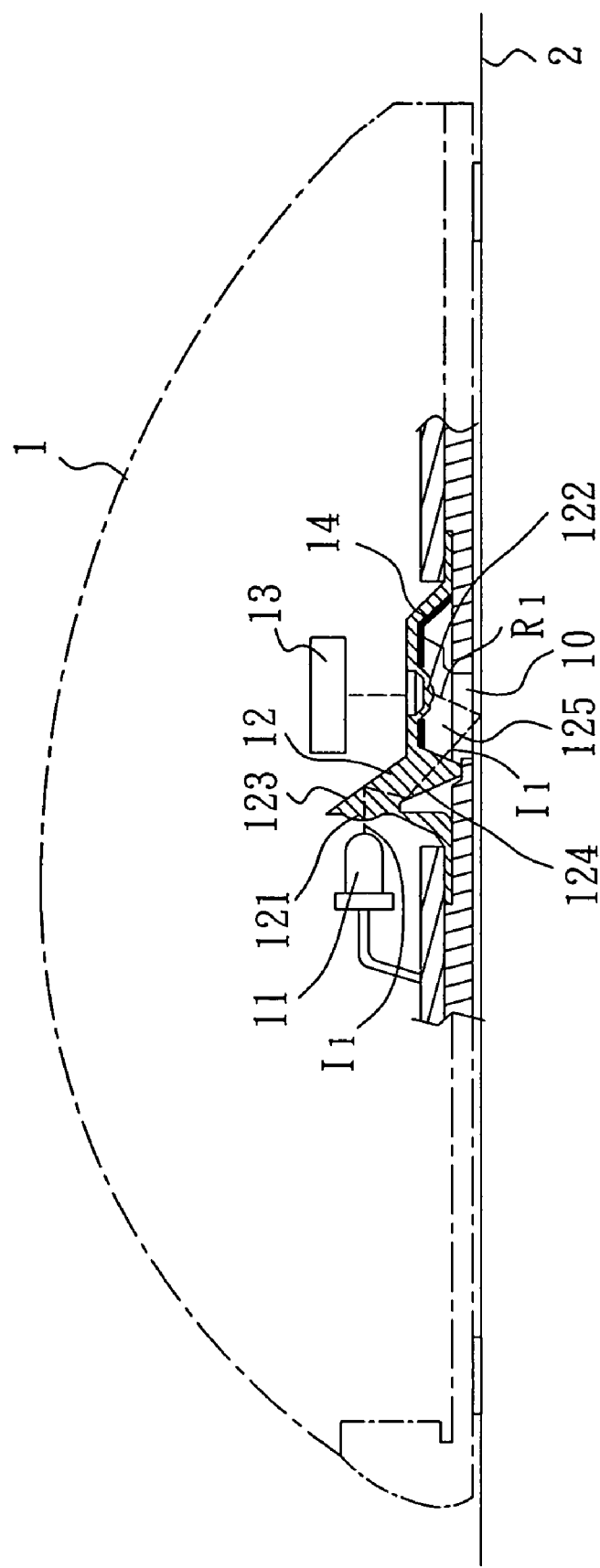
FIG. 3 is a cross-section of an optical mouse interior according to an embodiment of the invention.
Figure 4:
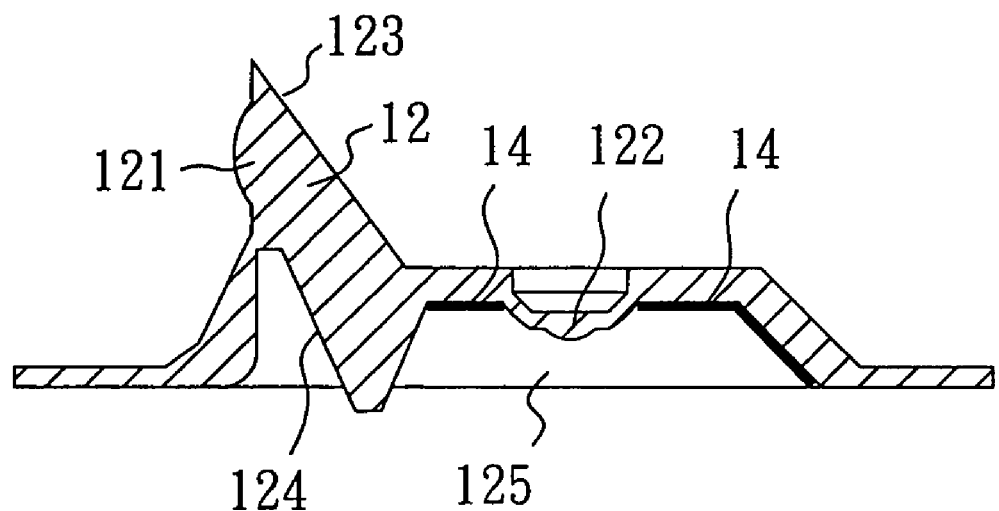
FIG. 4 is a cross-section of a light guiding device of FIG. 3.
Figure 5:
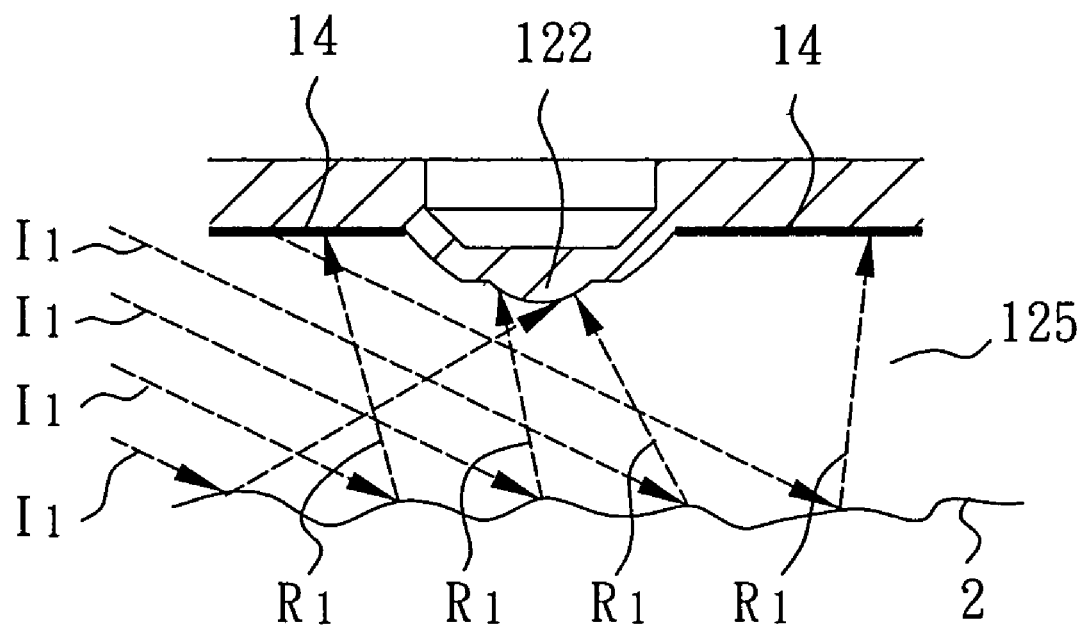
FIG. 5 is a schematic diagram of imaging formed by incident light in the optical mechanism according to the embodiment of the invention.

With reference to FIGS. 3 to 5, an embodiment of the invention is shown. FIG. 3 shows an optical mouse 1 with a bottom opening 10. An optical mechanism is implemented inside the optical mouse 1. The optical mechanism includes a light device 11, a light guiding device 12, a photosensor 13 and an absorbing layer 14. The light device 11 is preferably a light emitting diode (LED) die or the like. The absorbing layer 14 is preferably a black coating directly coating/attaching on a surface required to absorb light. Of course, a surface processing can be applied to the surface to form the absorbing layer 14.

As shown in FIG. 3, the light device 11 emits incident light $I_1$ parallel to the reflective plane 2. The incident light $I_1$ is projected just onto a first lens 121 of the light guiding device 12 for focusing. After focusing, a first prism 123 and a second prism 124 reflect the incident light $I_1$ such that the incident light $I_1$ is accurately guided to pass through the opening 10 and finally projected on the reflective plane 2. It is noted that the light device 11 can be implemented above the light guiding device while the light guiding device is appropriately adjusted in design to advantageously receive the incident light $I_1$, and further guide and project the incident light $I_1$ onto the reflective plane 2. Of course, the light device 11 can be implemented obliquely inside the optical mouse 1, in order to advantageously project the incident light directly (or after a lens focuses) on the reflective plane 2.

Because the reflective plane 2 is finely uneven or micro-scraggy, a plurality of beams of reflecting light $R_2$ are produced and reflected to different directions.

In FIG. 4, the inventive absorbing layer 14 is coated/attached on surface of a cavity 125 of the light guiding device 12 adjacent to a second prism 124. With reference to FIG. 5 in combination with FIG. 4, it is shown that several beams of reflecting light $R_1$ not directly projected to the second lens 122 are absorbed by the absorbing layer 14 coated/attached on surface of the cavity 125, so no reflection appears again. Meanwhile, remaining beams not absorbed by the absorbing layer 14 of reflecting light $R_1$ to the second lens 122 are focused and projected to the photosensor 13. At this point, the photosensor 13 can receive relatively high light points by such an illumination technique and accordingly increase light-and-shade contrast, i.e., high light points become brighter and low light points become darker. Further, micro-scragginess on the reflective plane 2 is significantly presented and thus the performance of determining images of the optical mouse 1 is increased.

For the optical mechanism implemented inside the optical mouse 1, an opening of the cavity 125 faces directly to the bottom opening of the optical mouse 1 and the second lens 122 is coaxially implemented with the photosensor 13. In addition, because reflecting light $R_1$ reaches the surface of the cavity firstly, the absorbing layer 14 is coated/attached to the surface of the cavity 125. If the reflecting light $R_1$ is not projected to the surface of the cavity 125 as the light guiding device 12 or other mechanism in the optical mouse 1 is improved, the absorbing layer 14 is coated/attached to a surface firstly contacted by the reflecting light $R_1$, generally to the surface adjacent to the surroundings of the photosensor 13. Thus, it is ensured that several beams of the reflecting light $R_1$ not directly projected to the photosensor 13 can be absorbed completely by the absorbing layer 14.

Although the present invention has been explained in relation to its preferred embodiment, it is to be understood that many other possible modifications and variations can be made without departing from the spirit and scope of the invention as hereinafter claimed.

What is claimed is:

1. An improved optical mechanism of an optical mouse, implemented inside the optical mouse with a bottom opening, comprising:

a light device, to provide an incident light;
   a light guiding device, to guide the incident light to pass through the bottom opening and thus project to a reflective plane;
   a photosensor implemented in the optical mouse above the bottom opening, to receive a reflecting light generated on the reflective plane by reflecting the incident light; and
   an absorbing layer coated and attached onto a surface around the photosensor, to absorb reflecting light not directly projected to the photosensor.

2. The improved optical mechanism as claimed in claim 1, wherein the light guiding device comprises of a first lens, a second lens, at least one prism and a cavity formed in a bottom of the light guiding device, such that the incident light is projected by the at least one prism to the reflective plane after being focused by the first lens, the second lens is implemented in the cavity to project the reflecting light to the photosensor after being focused, the cavity's opening faces directly to the bottom opening of the optical mouse, and the second lens is coaxially implemented with the photosensor.

3. The improved optical mechanism as claimed in claim 2, wherein the absorbing layer is coated/attached on a surface of the cavity of the light guiding device adjacent to the second lens in order to absorb reflecting light not directly projected to the second lens.

4. The improved optical mechanism as claimed in claim 1, wherein the light device is a light emitting diode (LED) die.

5. The improved optical mechanism as claimed in claim 1, wherein the absorbing layer is a black coating.

6. The improved optical mechanism as claimed in claim 1, wherein the absorbing layer is a layer produced by applying a surface processing to the surface adjacent to the photosensor surroundings.

* * * * *